(12) United States Patent
Oniduka et al.

(10) Patent No.: US 12,352,279 B2
(45) Date of Patent: Jul. 8, 2025

(54) ROTARY DRIVE DEVICE AND PUMP

(71) Applicant: IWAKI CO., LTD., Tokyo (JP)

(72) Inventors: Toshiki Oniduka, Iruma-gun (JP); Shinichirou Koreeda, Iruma-gun (JP); Toshiaki Kamei, Sayama (JP); Hikaru Saitou, Iruma-gun (JP); Masaya Ueno, Iruma-gun (JP); Takuya Seki, Sayama (JP)

(73) Assignee: IWAKI CO., LTD., Tokyo (JP)

( * ) Notice: Subject to any disclaimer, the term of this patent is extended or adjusted under 35 U.S.C. 154(b) by 404 days.

(21) Appl. No.: 18/013,603

(22) PCT Filed: May 13, 2021

(86) PCT No.: PCT/JP2021/018171
§ 371 (c)(1),
(2) Date: Dec. 29, 2022

(87) PCT Pub. No.: WO2022/004144
PCT Pub. Date: Jan. 6, 2022

(65) Prior Publication Data
US 2023/0287893 A1    Sep. 14, 2023

(30) Foreign Application Priority Data
Jul. 3, 2020 (JP) .................................. 2020-115775

(51) Int. Cl.
*F04D 29/048* (2006.01)
*F04D 13/06* (2006.01)
(Continued)

(52) U.S. Cl.
CPC ............ *F04D 29/048* (2013.01); *F04D 13/06* (2013.01); *H02K 3/04* (2013.01); *H02K 7/09* (2013.01); *H02K 16/04* (2013.01)

(58) Field of Classification Search
CPC ........ F04D 29/048; F04D 13/06; F04D 13/064; F04D 29/058; H02K 3/04; H02K 7/09;
(Continued)

(56) References Cited

U.S. PATENT DOCUMENTS 6,181,040 B1 * 1/2001 Schob .................. A61M 60/113
310/90.5
11,040,188 B2 * 6/2021 Cotter ................. A61M 60/857
(Continued)

FOREIGN PATENT DOCUMENTS

JP    2005-121157 A    5/2005
WO    2019/188068 A1   10/2019

OTHER PUBLICATIONS

Nov. 24, 2023 Extended Search Report issued in European Patent Application No. 21832969.6.

*Primary Examiner* — Ahmed Elnakib
(74) *Attorney, Agent, or Firm* — Oliff PLC

(57) ABSTRACT

A rotor, a magnetic bearing, and a drive unit that rotationally drives the rotor. The magnetic bearing includes a bearing stator and a ring-shaped bearing rotor member. The drive unit has a drive stator and a ring-shaped drive rotor member. The bearing stator has a plurality of bearing stator cores consisting of a magnetic material, disposed on an outer peripheral side of the bearing rotor member. The bearing stator core has a first portion extending in a first direction orthogonal to a direction facing the bearing rotor member, and a pair of second portions extending to a bearing rotor member side from both end portions in the first direction of the first portion. The drive stator is formed so as to pass through a position between an outer peripheral surface of the rotor and the first portion core and between the pair of second portions.

12 Claims, 9 Drawing Sheets

(51) Int. Cl.
*H02K 3/04* (2006.01)
*H02K 7/09* (2006.01)
*H02K 16/04* (2006.01)

(58) Field of Classification Search
CPC ........ H02K 16/04; H02K 1/2733; H02K 7/14; H02K 11/215; H02K 11/30; F16C 2360/44; F16C 2380/26; F16C 32/0465; F16C 32/0468; F16C 32/04; F16C 39/06
USPC ........................................................ 310/90.5
See application file for complete search history.

(56) References Cited

U.S. PATENT DOCUMENTS

| | | | |
|---|---|---|---|
| 2009/0079284 A1* | 3/2009 | Onuma | F16C 32/0465 310/90.5 |
| 2009/0121571 A1* | 5/2009 | Onuma | H02K 21/00 310/90.5 |
| 2011/0101905 A1* | 5/2011 | Filatov | F16C 32/048 310/156.08 |
| 2013/0009501 A1* | 1/2013 | Park | F16C 32/0465 310/90.5 |
| 2019/0199186 A1* | 6/2019 | Noh | H02K 21/20 |
| 2022/0123607 A1* | 4/2022 | Zhou | H02K 1/182 |
| 2022/0247266 A1* | 8/2022 | Oniduka | A61M 60/216 |

* cited by examiner

ROTARY DRIVE DEVICE AND PUMP

TECHNICAL FIELD

The present invention relates to a rotary drive device and a pump that employ a magnetic bearing.

BACKGROUND ART

There are known: a magnetic bearing that supports the likes of load of an impeller of a pump device in a contactless manner by a magnetic force; and a drive mechanism that rotationally drives the impeller (refer to Patent Document 1, for example). As shown in FIG. 12, such a magnetic bearing 200 is configured by, for example: a bearing rotor member 206 which is provided in a rotor 201 that comprises an impeller 200a; and a bearing stator 202 which is fixed to a housing 209.

Moreover, the magnetic bearing 200 has incorporated on its inner side in a radial direction a drive mechanism 300 which is configured by a permanent magnet array 301 provided in the rotor 201 and an air-core coil array 302 provided in the housing 209. The rotor 201 is rotationally moved by the drive mechanism 300 while being supported by the magnetic bearing 200.

PRIOR ART DOCUMENT

Patent Document

Patent Document 1: Japanese Laid-Open Patent Publication No. 2005-121157

SUMMARY OF THE INVENTION

Problem to be Solved by the Invention

In such a magnetic bearing 200, a restoring force to restore the rotor 201 to a designated position acts on the rotor 201, due to a magnetic flux φ passing through a magnetic circuit formed by a U-shaped stator core 204 configuring the bearing stator 202 and the bearing rotor member 206. Moreover, due to a magnetic flux p passing through a magnetic circuit formed by the permanent magnet array 301 and the air-core coil array 302, a reaction force to a Lorentz force acting on the air-core coil array 302 acts on the permanent magnet array 301, whereby a rotational force acts on the rotor 201.

However, due to there being a configuration in which the bearing stator 202 of the magnetic bearing 200 is disposed on an outer side in a radial direction of the rotor 201, and the air-core coil array 302 of the drive mechanism 300 is disposed on an inner side in a radial direction of the rotor 201, and, furthermore, the bearing rotor member 206 and permanent magnet array 301 are disposed in the rotor 201. Therefore, there has been a problem of there being more or less a limit to reduction of dimensions in a radial direction in the case where a rotary drive device including the magnetic bearing 200 and the drive mechanism 300 has been supposed, and that, in the case where, for example, this rotary drive device has been applied to a pump device, it will be difficult to achieve downsizing of the pump device overall.

The present invention, which was made in view of the above-described circumstances, has an object of providing a rotary drive device and a pump whose dimensions in a radial direction including those of their magnetic bearing and drive mechanism can be suppressed to achieve downsizing.

Means for Solving the Problem

A rotary drive device according to the present invention comprises: a rotor; a magnetic bearing that supports the rotor in a contactless manner by a magnetic force; and a drive unit that rotationally drives the rotor, the magnetic bearing comprising: a bearing stator disposed on an outer peripheral side of the rotor to support the rotor in a contactless manner by a magnetic force; and a ring-shaped bearing rotor member provided in the rotor, the bearing rotor member consisting of a magnetic material and forming a magnetic circuit along with the bearing stator, the drive unit including: a drive stator disposed on an outer peripheral side of the rotor to apply a rotational driving force to the rotor; and a ring-shaped drive rotor member disposed on an outer peripheral side of the bearing rotor member of the rotor to receive a rotational driving force from the drive stator, the bearing stator including: a plurality of bearing stator cores disposed on an outer peripheral side of the bearing rotor member, the bearing stator cores consisting of a magnetic material and forming a magnetic circuit along with the bearing rotor member; and a bearing coil wound around the bearing stator core, the bearing stator core including: a first portion extending in a first direction orthogonal to a direction facing the bearing rotor member; and a pair of second portions extending to a bearing rotor member side from both end portions in the first direction of the first portion, the bearing coil being wound around the first portion of the bearing stator core, and the drive stator being annularly formed so as to pass through a position between an outer peripheral surface of the rotor and the first portion of the bearing stator core and between the pair of second portions of the bearing stator core in the first direction.

In one embodiment of the present invention, the bearing stator core is formed so as to further include a pair of third portions that extend in an orientation of approaching each other in the first direction from the end portions on the bearing rotor member side of the pair of second portions, and then extend toward the bearing rotor member side.

In another embodiment of the present invention, the bearing rotor member includes: a circular ring-shaped bearing magnet; and a pair of circular ring-shaped yokes disposed so as to sandwich the bearing magnet in the first direction, the pair of yokes include: a pair of fourth portions covering both end surfaces in the first direction of the bearing magnet and extending in the first direction; and a pair of fifth portions extending to a bearing stator side from end portions on an opposite side to the bearing magnet of the pair of fourth portions, and between facing surfaces in the first direction of the pair of fifth portions, there is disposed a spacer consisting of a non-magnetic body, that supports the drive rotor member in such a manner that the drive rotor member will be contactless with the pair of yokes and the bearing magnet.

In yet another embodiment of the present invention, the bearing rotor member includes: a circular ring-shaped bearing magnet; and a pair of circular ring-shaped yokes disposed so as to sandwich the bearing magnet in the first direction, the pair of yokes include: a pair of fourth portions covering both end surfaces in the first direction of the bearing magnet and extending in a direction facing the bearing stator; and a pair of fifth portions extending in an orientation of approaching each other in the first direction from end portions on an opposite side to the bearing stator of the pair of fourth portions, between facing surfaces in the first direction further to a bearing stator side than the bearing magnet of the pair of fourth portions, there is disposed a spacer consisting of a non-magnetic body, that supports the drive rotor member in such a manner that the drive rotor member will be contactless with the pair of yokes and the bearing magnet, between the fifth portions and the bearing magnet, there is formed a first gap, and between each of tip portions facing each other of the pair of fifth portions, there is provided a second gap.

In yet another embodiment of the present invention, a plurality of the bearing stators are disposed along a peripheral direction of the bearing rotor member on an outer side in a radial direction of the bearing rotor member, and the bearing stators each face the bearing rotor member in a radial direction.

In yet another embodiment of the present invention, the drive stator includes: a circular ring-shaped drive stator core that faces the drive rotor member from an outer side in a radial direction, the drive stator core consisting of a magnetic material and having a plurality of magnetic poles that lie along a peripheral direction of the drive rotor member; and a drive coil wound around a slot of the drive stator core.

A pump according to the present invention comprises: a rotor; a magnetic bearing that supports the rotor in a contactless manner by a magnetic force; a drive unit that rotationally drives the rotor; and a pump mechanism that includes an impeller which is fitted to the rotor, the magnetic bearing comprising: a bearing stator disposed on an outer peripheral side of the rotor to support the rotor in a contactless manner by a magnetic force; and a ring-shaped bearing rotor member provided in the rotor, the bearing rotor member consisting of a magnetic material and forming a magnetic circuit along with the bearing stator, the drive unit including: a drive stator disposed on an outer peripheral side of the rotor to apply a rotational driving force to the rotor; and a ring-shaped drive rotor member disposed on an outer peripheral side of the bearing rotor member of the rotor to receive a rotational driving force from the drive stator, the bearing stator including: a plurality of bearing stator cores disposed on an outer peripheral side of the bearing rotor member, the bearing stator cores consisting of a magnetic material and forming a magnetic circuit along with the bearing rotor member; and a bearing coil wound around the bearing stator core, the bearing stator core including: a first portion extending in a first direction orthogonal to a direction facing the bearing rotor member; and a pair of second portions extending to a bearing rotor member side from both end portions in the first direction of the first portion, the bearing coil being wound around the first portion of the bearing stator core, and the drive stator being annularly formed so as to pass through a position between an outer peripheral surface of the rotor and the first portion of the bearing stator core and between the pair of second portions of the bearing stator core in the first direction.

In one embodiment of the present invention, the bearing stator core is formed so as to further include a pair of third portions that extend in an orientation of approaching each other in the first direction from the end portions on the bearing rotor member side of the pair of second portions, and then extend toward the bearing rotor member side.

In another embodiment of the present invention, the bearing rotor member includes: a circular ring-shaped bearing magnet; and a pair of circular ring-shaped yokes disposed so as to sandwich the bearing magnet in the first direction, the pair of yokes include: a pair of fourth portions covering both end surfaces in the first direction of the bearing magnet and extending in the first direction; and a pair of fifth portions extending to a bearing stator side from end portions on an opposite side to the bearing magnet of the pair of fourth portions, and between facing surfaces in the first direction of the pair of fifth portions, there is disposed a spacer consisting of a non-magnetic body, that supports the drive rotor member in such a manner that the drive rotor member will be contactless with the pair of yokes and the bearing magnet.

In yet another embodiment of the present invention, the bearing rotor member includes: a circular ring-shaped bearing magnet; and a pair of circular ring-shaped yokes disposed so as to sandwich the bearing magnet in the first direction, the pair of yokes include: a pair of fourth portions covering both end surfaces in the first direction of the bearing magnet and extending in a direction facing the bearing stator; and a pair of fifth portions extending in an orientation of approaching each other in the first direction from end portions on an opposite side to the bearing stator of the pair of fourth portions, between facing surfaces in the first direction further to a bearing stator side than the bearing magnet of the pair of fourth portions, there is disposed a spacer consisting of a non-magnetic body, that supports the drive rotor member in such a manner that the drive rotor member will be contactless with the pair of yokes and the bearing magnet, between the fifth portions and the bearing magnet, there is formed a first gap, and between each of tip portions facing each other of the pair of fifth portions, there is provided a second gap.

In yet another embodiment of the present invention, a plurality of the bearing stators are disposed along a peripheral direction of the bearing rotor member on an outer side in a radial direction of the bearing rotor member, and the bearing stators each face the bearing rotor member in a radial direction.

In yet another embodiment of the present invention, the drive stator includes: a circular ring-shaped drive stator core that faces the drive rotor member from an outer side in a radial direction, the drive stator core consisting of a magnetic material and having a plurality of magnetic poles that lie along a peripheral direction of the drive rotor member; and a drive coil wound around a slot of the drive stator core.

Effect of the Invention

Due to the present invention, dimensions in a radial direction including those of a magnetic bearing and a drive mechanism can be suppressed to achieve downsizing.

BRIEF DESCRIPTION OF THE DRAWINGS

FIG. 6 is a perspective view schematically showing overall configuration of another pump applied with same rotary drive device, with part of the overall configuration rendered see-through.

EMBODIMENTS FOR CARRYING OUT THE INVENTION

Rotary drive devices and pumps according to embodiments of the present invention will be described in detail below with reference to the accompanying drawings. However, the embodiments below do not limit the inventions according to each of the claims, moreover, not all of the combinations of features described in the embodiments are necessarily essential to the means for solving the problem of the invention. Moreover, in the embodiments below, configuring elements that are the same or equivalent will be assigned with the same symbols, and duplicated explanations thereof will be omitted. Moreover, in the embodiments, reduction scales or dimensions of each of the configuring elements will sometimes be shown exaggerated, and some of the configuring elements will sometimes be omitted.

First Embodiment

[Configuration of Rotary Drive Device and Pump]

Figure 1:
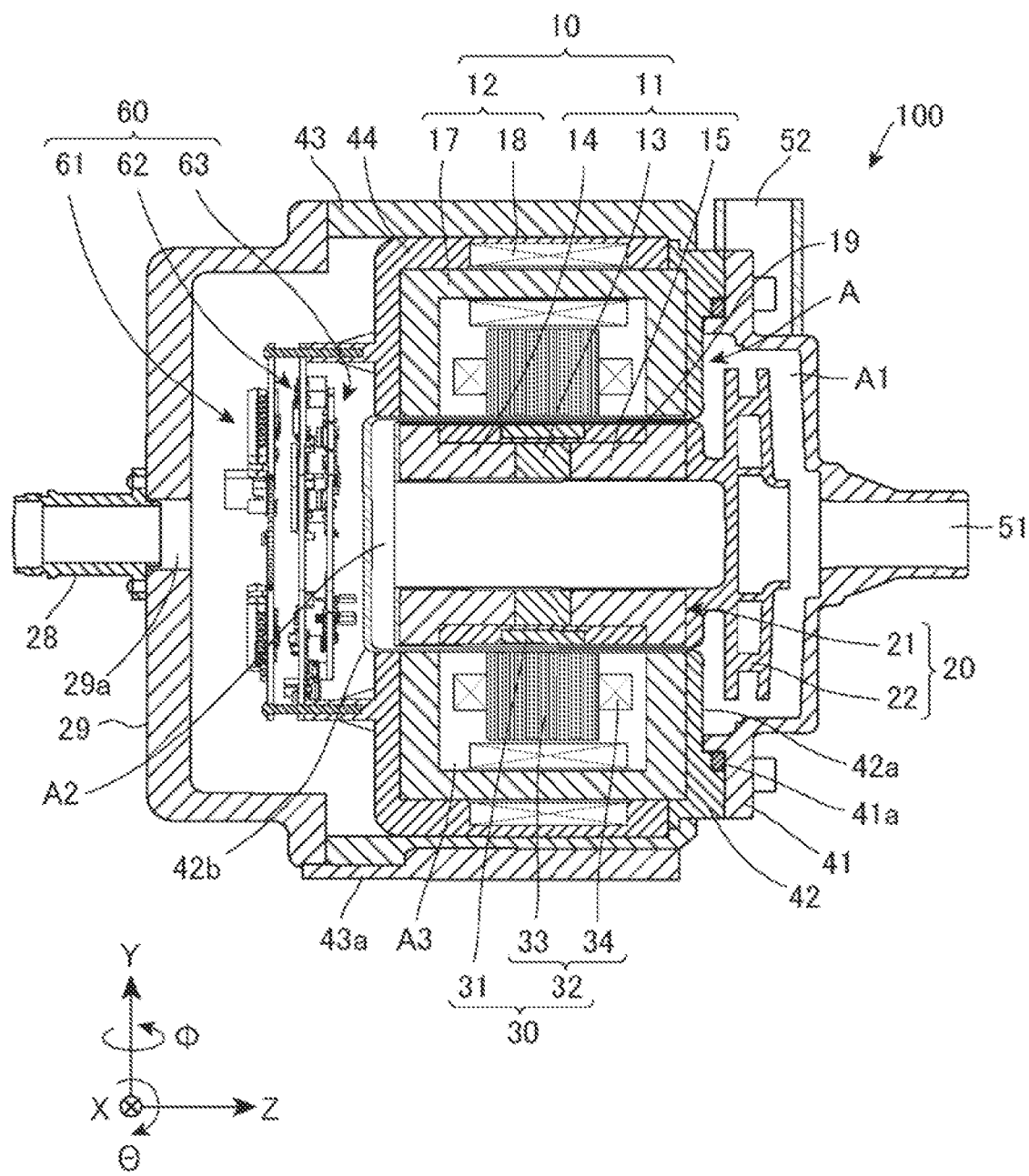
FIG. 1 is a longitudinal cross-sectional view schematically showing overall configuration of a pump applied with a rotary drive device according to a first embodiment of the present invention.
Figure 2:
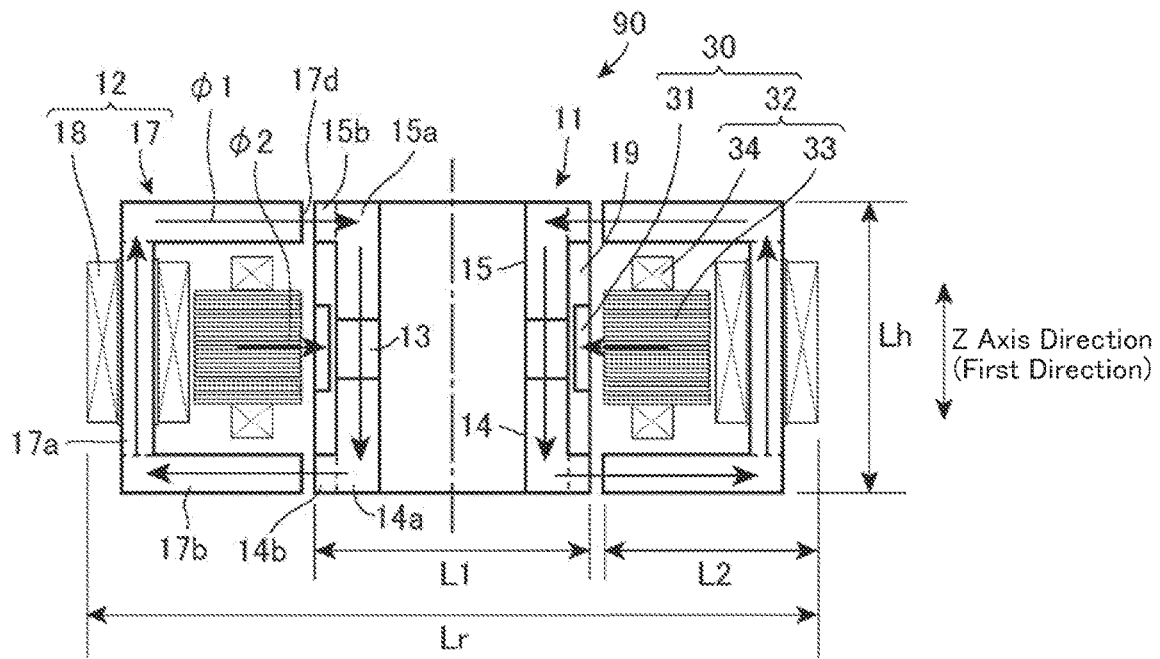
FIG. 2 is an enlarged longitudinal cross-sectional view schematically showing same rotary drive device.
Figure 3A:
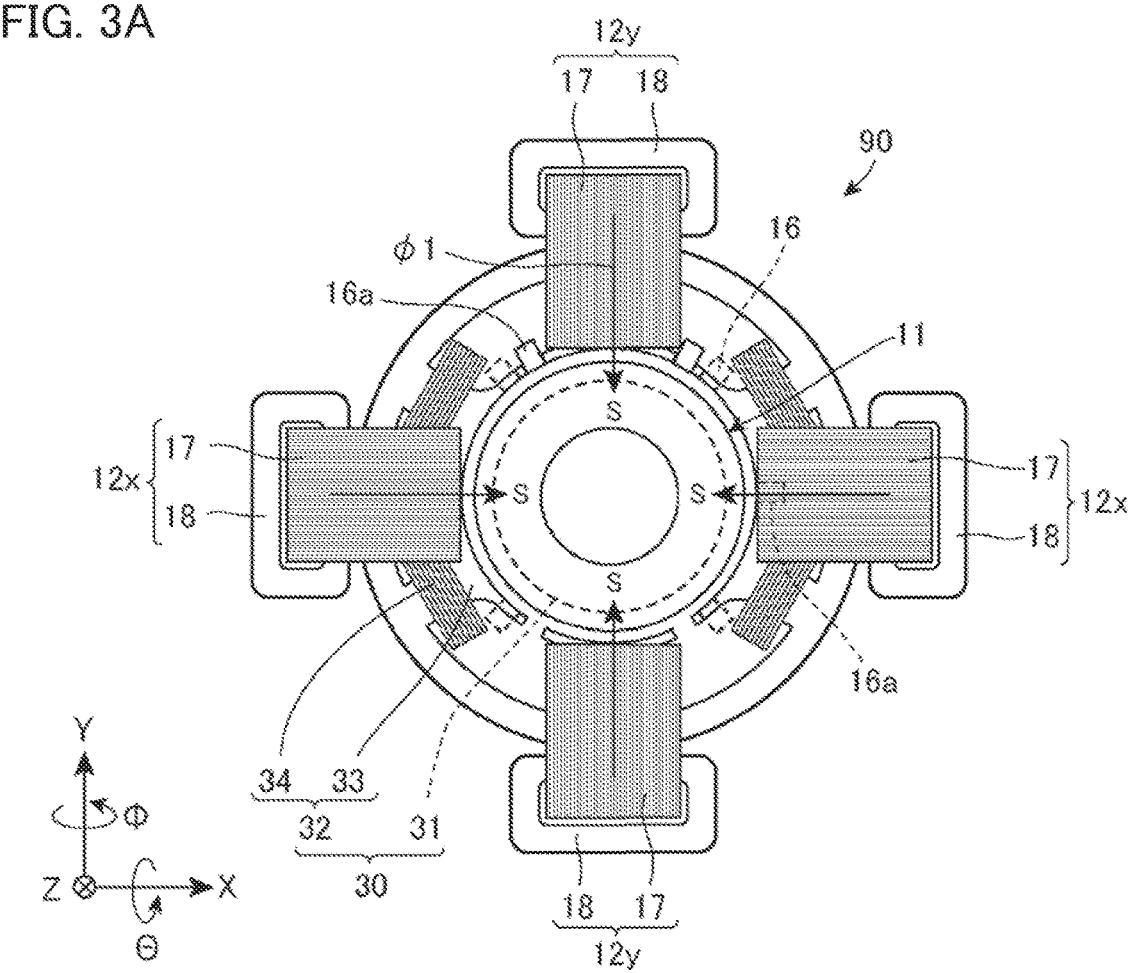
FIG. 3A is a top view schematically showing overall configuration of same rotary drive device.
Figure 3B:
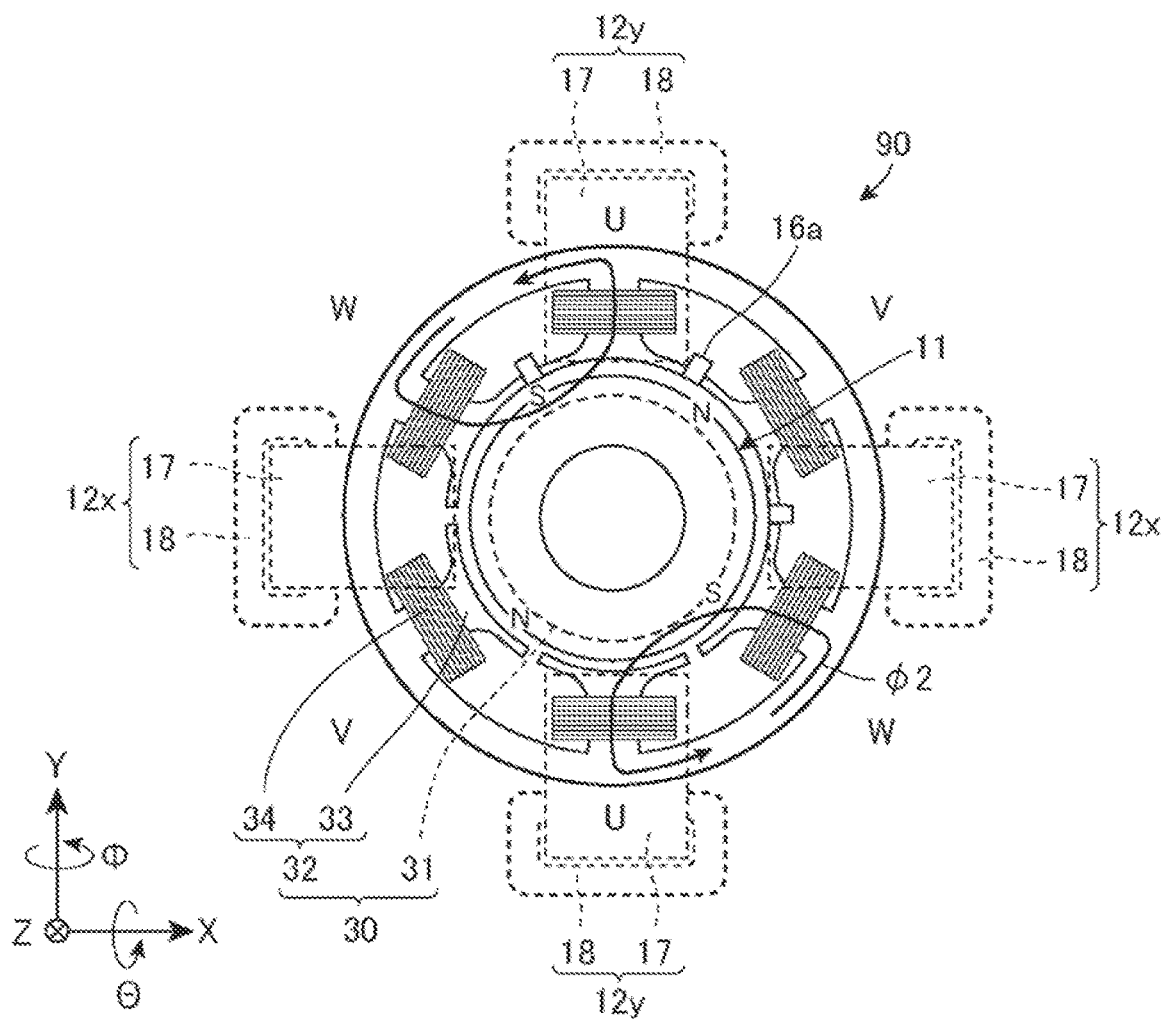
FIG. 3B is a top view schematically showing overall configuration of a drive unit of same rotary drive device.

FIG. 1 is a longitudinal cross-sectional view schematically showing overall configuration of a pump 100 applied with a rotary drive device 90 according to a first embodiment. FIG. 2 is an enlarged longitudinal cross-sectional view schematically showing the rotary drive device 90; FIG. 3A is a top view schematically showing overall configuration of the rotary drive device 90; and FIG. 3B is a top view schematically showing overall configuration of a drive unit 30. Moreover, FIG. 4 is a perspective view schematically showing overall configuration of the rotary drive device 90, with part of the overall configuration cut away; and FIG. 5 is a perspective view schematically showing overall configuration of a bearing/rotor unit 21 of a rotor 20 of the rotary drive device 90, with part of the overall configuration cut away.

Figure 4:
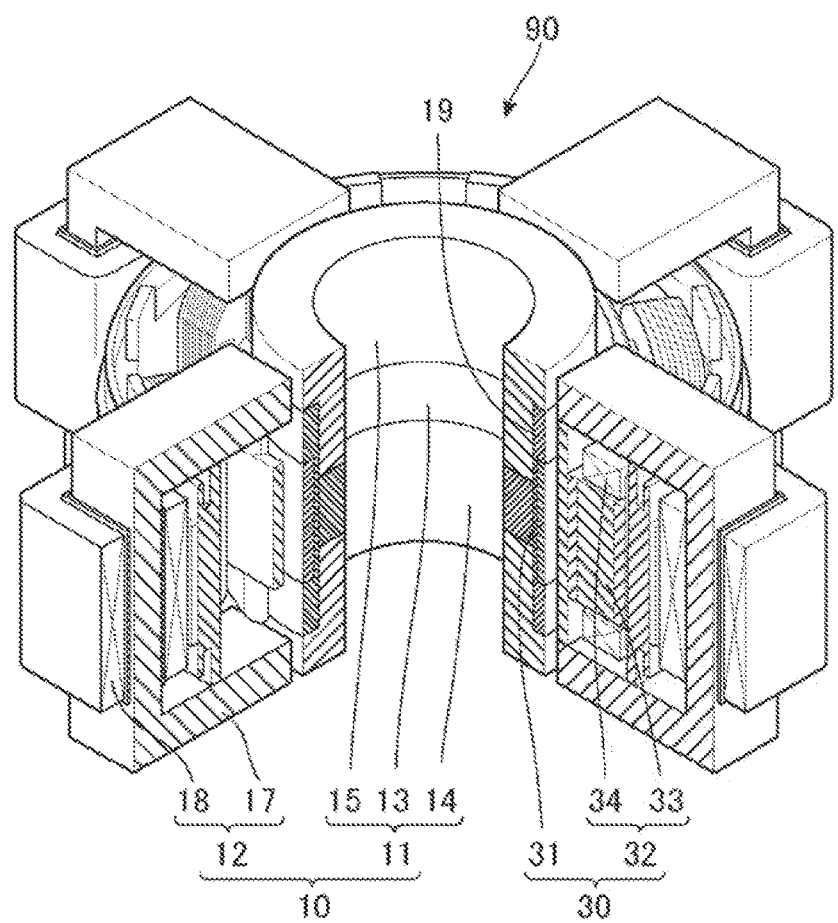
FIG. 4 is a perspective view schematically showing overall configuration of same rotary drive device, with part of the overall configuration cut away.
Figure 5:
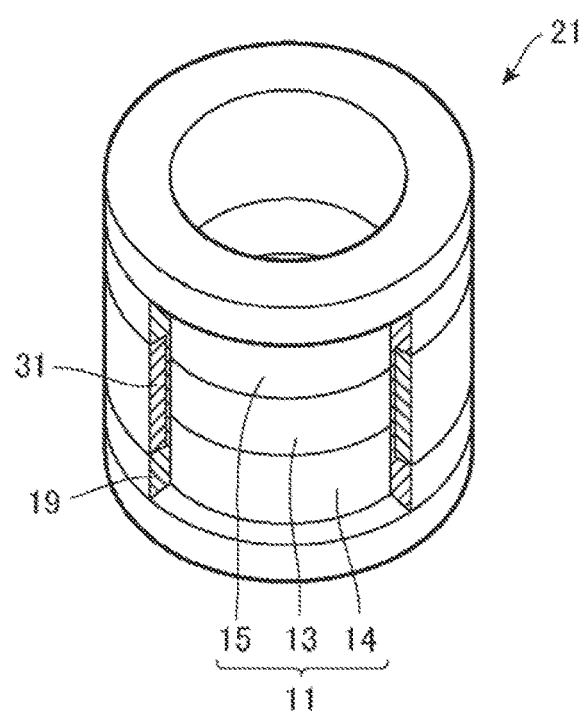
FIG. 5 is a perspective view schematically showing overall configuration of a bearing/rotor unit of a rotor of same rotary drive device, with part of the overall configuration cut away.

As shown in FIGS. 1 to 5, the pump 100 according to the first embodiment comprises: the rotor 20; a magnetic bearing 10 that supports this rotor 20 in a contactless manner by a magnetic force; and the drive unit 30 that rotationally drives the rotor 20. Moreover, the pump 100 comprises: a pump mechanism that includes an impeller 22 which is fitted to the rotor 20; and a control unit 60 that performs overall control of the pump mechanism. Note that in this example, the pump 100 is shown. However, if attention is focused solely on a function of rotationally driving the rotor 20 while supporting it in a contactless manner, then, as shown in FIGS. 3A and 4, these rotor 20, magnetic bearing 10, and drive unit 30 may be regarded as the rotary drive device (bearingless motor) 90 employing the magnetic bearing 10. Moreover, if attention is focused solely on a function of rotationally driving the rotor 20 in this rotary drive device 90, then, as shown in FIG. 3B, the drive unit 30 may be regarded as a motor device (brushless motor).

Note that in the description hereafter, a rotational axis (Z axis) direction of the rotor 20 will be called a Z axis direction (and will also be called an axial direction and a Z direction); a radial direction of the rotor 20 will be called an X axis direction and a Y axis direction (and will also be called a radial direction, an X direction, and a Y direction); a direction of rotation around the X axis will be called a $\Theta$ direction; and a direction of rotation around the Y axis will be called a $\Phi$ direction. Moreover, the X axis, the Y axis, and the Z axis are assumed to be orthogonal to each other. Moreover, a right side when facing the paper surface of FIG. 1 is assumed to be a front side of the pump 100, and a left side when facing the paper surface of FIG. 1 is assumed to be a rear side of the pump 100.

The pump 100, whose entirety is formed in a cylindrical shape, for example, has a front casing 41 on one side in the Z axis direction (the front side) thereof. The front casing 41, which forms a pump chamber A1 on its inside, has in its front center portion a cylindrically-shaped inlet port 51 that communicates with the pump chamber A1. Moreover, the front casing 41 has in its side surface a discharge port 52 that likewise communicates with the pump chamber A1.

The front casing 41 has its rear end connected with a rear casing 42 in a state of them having been sealed by an O-ring 41a, for example. The rear casing 42, together with the front casing 41, form a sealed space A that includes the pump chamber A1. In addition, the rear casing 42 forms a rearwardly-projecting cylindrical space (housing space) A2.

An outer side in the radial direction (an outer peripheral side) on a rear side of the rear casing 42 is covered by a cylindrically-shaped housing 43. A lower portion of the housing 43 is provided with a pump base 43a that supports the pump 100. Moreover, a rear side of the housing 43 is covered by a rear cover 29 that houses the control unit 60 in its inner space. A center portion of the rear cover 29 has formed therein an inserting hole 29a of the likes of a harness connected to the control unit 60, and a rear side of this inserting hole 29a is connected with a cable joint 28.

The sealed space A houses the rotor 20 in a state allowing the rotor 20 to levitate (be supported in a contactless manner). The rotor 20, whose entirety is formed by a non-magnetic body of the likes of a resin material, for example, is configured having formed integrally therein: the impeller 22 which is provided on its front side being one end in the Z axis direction thereof; and the annular bearing/rotor unit 21 which is provided on its rear side being the other end in the Z axis direction thereof. The impeller 22 is housed in the pump chamber A1 on the inside of the front casing 41, and, together with this pump chamber A1, configures the pump mechanism.

On the other hand, the rear casing 42 includes: a frontward flange portion 42a; and a cylindrical projection 42b rearwardly projecting from a center portion of this flange portion 42a, and the bearing/rotor unit 21 is housed in the cylindrical space A2 on the inside of the cylindrical projection 42*b* of the rear casing 42. A cylindrically-shaped stator base 44 is provided on an inner side of the housing 43. The stator base 44 forms an annular space A3 enclosing the cylindrical space A2, between the flange portion 42*a* and outer peripheral surface of the cylindrical projection 42*b* of the rear casing 42. Moreover, a bearing stator 12 and a motor stator 32 which acts as a drive stator, that will be mentioned later, are provided in this annular space A3.

The magnetic bearing 10 includes: a ring-shaped bearing rotor member 11 consisting of a magnetic material, mounted on an inner peripheral side of the bearing/rotor unit 21 of the rotor 20; and the bearing stator 12 disposed on an outer side in the radial direction of this bearing rotor member 11, at a certain interval from the bearing rotor member 11, for example.

As shown in FIG. 5, for example, the bearing rotor member 11 includes: a bearing magnet 13 consisting of a neodymium magnet molded into a circular ring-like shape; and a pair of circular ring-shaped yokes 14, 15 consisting of electromagnetic soft iron, disposed concentrically with this bearing magnet 13 so as to sandwich both end surfaces in an axial direction (the Z axis direction) of the bearing magnet 13 in the axial direction.

The bearing magnet 13 is magnetized so that its N pole and S pole face each other in the axial direction, and so as to be homopolar over an entire periphery in a peripheral direction, for example. Note that, as shown in FIG. 2, the bearing magnet 13 supplies a bias magnetic flux φ1 to a magnetic circuit formed by the bearing rotor member 11 and a later-mentioned bearing stator core 17 of the bearing stator 12.

On the other hand, as shown in FIGS. 3A and 3B, for example, a plurality of the bearing stators 12 are disposed at angles of 90° at four places in the peripheral direction of the bearing rotor member 11. The pair of bearing stators 12 that face each other in the X axis direction (bearing stators 12*x*), for example, of these bearing stators 12 control position in the X axis direction and angle in the Φ direction of the rotor 20, by control of the control unit 60, and the pair of bearing stators 12 that face each other in the Y axis direction (bearing stators 12*y*), for example, of these bearing stators 12 control position in the Y axis direction and angle in the θ direction of the rotor 20, by control of the control unit 60. Moreover, these bearing stators 12 (12*x*, 12*y*) control height in the Z axis direction of the rotor 20.

Note that a plurality of (here, for example, four) displacement sensors 16 capable of detecting displacement in the radial direction and each of rotational directions of the bearing rotor member 11 are disposed in the stator base 44, so as to be at angles of 45° to each of the bearing stators 12 (that is, so as to intersect each of the X axis direction and the Y axis direction at angles of 45°).

While these displacement sensors 16 may each be an eddy current type sensor, for example, they are not thus limited, and there may be adopted a variety of sensors therefor. Moreover, the number of bearing stators 12 is not limited to the above-described number, and there may be adopted various forms in which there are, for example, six, eight, 10, 12, 16, and so on, thereof. In addition, displacement sensors include not only the above-described displacement sensor 16, but also for example a sensor which is provided facing the bearing/rotor unit 21 in the axial direction in the likes of the stator base 44, and is capable of detecting displacement in the axial direction and rotational directions of the likes of the bearing rotor member 11, although illustration of this sensor is omitted. Note that dispositional states or numbers of the displacement sensor 16, and so on, are not thus limited, and there may be adopted a variety of forms therefor.

The bearing stator 12 includes, for example: the bearing stator core 17 consisting of a magnetic material, of the likes of a laminated electromagnetic steel plate; and a bearing coil 18 wound around the bearing stator core 17. A longitudinal cross-sectional shape of the bearing stator core 17 is formed in substantially a C shape (a U shape) having its open end on a bearing rotor member 11 side. Specifically, as shown in FIG. 2, the bearing stator core 17 has its longitudinal cross-sectional shape configured to include, for example: a first portion 17*a* which extends in a first direction (in this example, the Z axis direction) orthogonal to a direction of facing the bearing rotor member 11 (the radial direction); and a pair of second portions 17*b* that extend to the bearing rotor member 11 side from both end portions in the Z axis direction of this first portion 17*a*. Note that the first portion 17*a* is wound around by the bearing coil 18.

Note that, as shown in FIG. 3A, while an outer peripheral surface of the bearing rotor member 11 is configured by a curved surface, a magnetic pole surface 17*d* (refer to FIG. 2) of the bearing stator core 17 is formed by a planar surface. Specifically, the magnetic pole surface 17*d* is formed on the selfsame planar surface extending in the X or Y axis direction and the Z axis direction. Generally, if the magnetic pole surface 17*d* of the bearing stator core 17 is configured by a curved surface following the outer peripheral surface of the bearing rotor member 11, it will result in the bias magnetic flux φ1 of a magnetic field ending up concentrating in end portions in a peripheral direction of the magnetic pole surface 17*d*. In contrast, when the magnetic pole surface 17*d* is formed by a planar surface, it becomes possible for such a concentration of the bias magnetic flux φ1 to be prevented.

On the other hand, the pair of yokes 14, 15 of the bearing rotor member 11 have their longitudinal cross-sectional shapes configured to include, for example: a pair of fourth portions 14*a*, 15*a* covering both end surfaces in the first direction of the bearing magnet 13 and extending in the first direction; and a pair of fifth portions 14*b*, 15*b* extending to a bearing stator 12 side from end portions on an opposite side to the bearing magnet 13 of the pair of fourth portions 14*a*, 15*a*.

The drive unit 30 includes: a ring-shaped motor magnet 31 acting as a drive rotor member, disposed on an outer peripheral side of the bearing/rotor unit 21 of the rotor 20, that is, on an outer side in a radial direction (the radial direction) of the bearing magnet 13 of the bearing rotor member 11; and the motor stator 32 acting as a drive stator, disposed on an outer side in the radial direction of this motor magnet 31, at a certain interval from the motor magnet 31, for example. The motor stator 32 applies a rotational driving force to the rotor 20, and the motor magnet 31 receives a rotational driving force from the motor stator 32.

The motor magnet 31 consists of a neodymium magnet magnetized in a 4-polar manner in the radial direction, for example. The motor magnet 31 is supported in a manner that it will be contactless with the pair of yokes 14, 15 and the bearing magnet 13, by a circular ring-shaped spacer 19 disposed between surfaces facing each other in the first direction of the pair of fifth portions 14*b*, 15*b* of the pair of yokes 14, 15, and is disposed so as to be confined within a dimension in the radial direction (a diameter) L1 of the bearing rotor member 11. Note that the spacer 19 is formed by a non-magnetic body of a resin material or metal material.

The motor stator 32 has a circular ring-shaped motor stator core 33 consisting of a magnetic material, that faces the motor magnet 31 from an outer side in the radial direction and has a plurality of magnetic poles lying along a peripheral direction of the motor magnet 31. The motor stator core 33 comprises six slots having concave magnetic pole surfaces lying along an outer peripheral surface of the motor magnet 31, for example. In addition, the motor stator 32 has a motor coil 34 acting as a drive coil, wound around each of the slots of this motor stator core 33. The motor stator 32 is annularly formed so as to pass through a position between an outer peripheral surface of the rotor 20 and the first portion 17a of the bearing stator core 17 and between the pair of second portions 17b of the bearing stator core 17 in the Z direction. That is, the motor stator 32 is disposed so as to be confined within a dimension L2 in the radial direction of the bearing stator 12 between the pair of second portions 17b of the bearing stator core 17 on an inner side in the radial direction of the bearing coil 18 in the bearing stator 12. Moreover, in order to detect rotation angle around the Z axis of the bearing rotor member 11, three Hall ICs 16a are provided at angles of 60° between four of the slots adjacent in the peripheral direction of the motor stator 32, as shown in FIGS. 3A and 3B. Note that dispositional states or number of the Hall ICs 16a are not thus limited, and there may be adopted a variety of forms therefor.

Moreover, as shown in FIG. 3B, the thus-configured motor stator 32, which is configured as a stator of a U phase, V phase, and W phase three-phase six-slot four-pole sensored brushless motor, generates a magnetic flux $\varphi 2$ to rotationally drive the motor magnet 31 which is magnetically coupled to the motor stator 32 and included in the rotor 20, and thereby rotationally drive the rotor 20. Note that in the drawings excluding FIG. 1, illustration of a non-magnetic body covering a periphery of the bearing/rotor unit 21 is omitted. Moreover, the drive unit 30 is not limited to the above-described kind of three-phase six-slot four-pole brushless motor, and may be applied to, for example, a configuration consisting of a 10-pole motor magnet 31 and a motor stator 32 having a 12-slot motor stator core 33, or a configuration consisting of a 14-pole motor magnet 31 and a motor stator 32 having a 12-slot motor stator core 33, and so on. Note that when the drive unit 30 is a sensorless brushless motor, it need not be provided with the Hall IC 16a, for example.

The control unit 60 includes, for example: a first circuit board 61 such as a driver circuit board equipped with MOS-FETs, or the like, that drive the bearing coil 18 of the magnetic bearing 10 and motor coil 34 of the drive unit 30; a second circuit board 62 such as a CPU circuit board that controls the magnetic bearing 10 and drive unit 30; and a third circuit board 63 such as an encoder circuit board that processes signals from the various kinds of sensors. The control unit 60 detects displacement in each direction and each rotational direction of the rotor 20 by means of its third circuit board 63, based on detection signals such as voltage changes from an entirety of the displacement sensors including the above-mentioned displacement sensor 16, and, accordingly, the second circuit board 62 of the control unit 60 finely controls current flowing in the bearing coil 18 of the bearing stator 12 of the magnetic bearing 10. This makes it possible for the control unit 60 to control position in the X axis direction and angle in the 45 direction, position in the Y axis direction and angle in the $\Theta$ direction, and height in the Z axis direction, of the rotor 20, in real time, and thereby correct rotational position of the rotor 20. Moreover, the control unit 60 detects changes in magnetic field by means of its second circuit board 62, based on detection signals from the Hall ICs 16a, and finely controls current flowing in the motor coil 34 of the motor stator 32 of the drive unit 30 to thereby control rotary operation of the rotor 20 by means of its first circuit board 61, for example.

[Operation of Rotary Drive Device and Pump]

Next, operation of the pump 100 applied with the rotary drive device 90 configured as above will be described.

In the pump 100 of the above-mentioned configuration, a magnetic circuit of the magnetic bearing 10 and a magnetic circuit of the drive unit 30 are independent of each other, and do not interfere with each other. That is, as shown in FIGS. 2 and 3A, the magnetic circuit passed through by the magnetic flux $\varphi 1$, formed by the magnetic bearing 10, is formed along an XZ plane and YZ plane parallel to the rotational axis Z of the rotor 20. On the other hand, as shown in FIGS. 2 and 3B, the magnetic circuit passed through by the magnetic flux $\varphi 2$, formed by the drive unit 30, is formed along an XY plane orthogonal to the rotational axis Z of the rotor 20. Since the motor stator 32 is annularly formed so as to pass through a space between the pair of second portions 17b of the bearing stator core 17 and since the motor magnet 31 is disposed further to an outer peripheral side than the bearing rotor member 11, the magnetic circuit of the magnetic bearing 10 is formed surrounding an outer side of the magnetic circuit of the drive unit 30.

In order for the control unit 60 to correct displacement in each of the XYZ axis directions and inclination in the $\Phi$ and $\Theta$ directions of the rotor 20 detected by the displacement sensor 16, and so on, it controls current flowing in the bearing coil 18 as described above, and thereby adjusts a control magnetic flux generated by the bearing coil 18. As a result, the rotor 20 maintains a certain position and certain posture due to the magnetic bearing 10, while at the same time being supported by the magnetic bearing 10 in a contactless state.

When three-phase alternating-current electric power is supplied to the motor coil 34 of the motor stator 32 of the drive unit 30 in this state, the three-phase brushless motor actuates, and the rotor 20 thereby rotates in a certain rotational direction. When the rotor 20 rotates, the impeller 22 rotates in a contactless manner within the sealed space A, so that a transfer fluid is introduced into the pump chamber A1 via the inlet port 51, and the transfer fluid discharged from inside the pump chamber A1 to outside via the discharge port 52.

[Advantages of Embodiment]

Due to the pump 100 that employs the rotary drive device 90 according to the present embodiment, the bearing stator 12 of the magnetic bearing 10 and motor stator 32 of the drive unit 30 are disposed on an outer side of the rotor 20, moreover, the motor stator 32 is disposed in a space on an inner side of the bearing stator core 17 of the magnetic bearing 10. Therefore, it becomes unnecessary for a stator to be disposed on the inner side of the rotor 20, and it is possible for a dimension in the radial direction (a diameter) Lr of the rotary drive device 90 overall to be made smaller compared to that of a conventional rotary drive device.

Moreover, due to a dimension in the Z axis direction of the bearing stator core 17 being set to a level at which the motor stator 32 will be confined between the pair of second portions 17b, said dimension does become longer than if the motor stator 32 was not present. However, since the bearing coil 18 of the bearing stator 12 is wound around the first portion 17a extending in the Z axis direction of the bearing stator core 17 and does not project in the Z axis direction, a dimension Lh in the Z axis direction of the rotary drive device 90 overall can be set to the same dimension as height in the Z axis direction of the bearing stator core 17. This makes it possible for the dimension Lh in the Z axis direction of the rotary drive device 90 overall to be suppressed to a level that will be just slightly larger compared to that of a conventional rotary drive device. It is hence possible for dimensions in the radial direction and axial direction of the rotary drive device 90 including the magnetic bearing 10 and drive unit 30 to be suppressed to the utmost, and for sufficient downsizing to thereby be achieved overall.

Specifically, for example, assuming a dimension in the radial direction of a conventional rotary drive device to be 100%, the dimension Lr in the radial direction of the rotary drive device 90 can be set to a level of approximately 70% thereof, and the dimension Lh in the Z axis direction of the rotary drive device 90 can be kept to an increase in level of approximately 1.1 times a dimension in the Z axis direction (a height) of the conventional rotary drive device. As a result, overall downsizing of the pump 100 adopting the rotary drive device 90, too, can be achieved. Moreover, in the rotary drive device 90 configured in this way, since the magnetic bearing 10 supports the rotor 20 on both sides in the Z direction, and the drive unit 30 drives at the very center in the Z direction of the rotor 20, balance of a driving force on the rotor 20 is extremely favorable. Moreover, since the magnetic bearing 10 and the drive unit 30 exert no effect on each other's magnetic circuit, the two do not hinder each other's performance.

Furthermore, since the bearing stator 12 and the motor stator 32 are disposed on the outer side of the rotor 20, and the motor stator 32 is disposed in the space on the inner side of the bearing stator core 17 so that both its sides in the axial direction are straddled by the bearing stator core 17, it becomes possible for greater weight-saving and downsizing by a simpler structure and at a cheaper price to be achieved, compared to in a general rotary drive device having a structure of the kind where two biaxial magnetic bearings are employed to support both ends in the axial direction of the drive unit 30 in four or more axes. At the same time, since magnetic levitation of the rotor 20 is controlled by the biaxially-controlled magnetic bearing 10, there will be no complication of control structure, so circuit configuration of a control system can be simplified, whereby, for example, the number of heat-generating bodies (the bearing coil 18, MOS-FETs of the first circuit board 61, and so on) will be reduced, and the configuration, circuit board design, and so on, of the control unit 60 will be simplified. Note that in the case of the pump 100 of the present embodiment, the impeller 22 is disposed on one side of the rotor 20, so when the rotor 20 inclines with respect to the Z axis, the rotor 20 will incline with its rotational center at a position close to the impeller 22 on the Z axis. Therefore, if the displacement sensors 16 are priorly disposed at positions separated from the impeller 22, preferably at positions at a center in the Z axis direction of the bearing/rotor unit 21, then the position in the X axis direction and angle in the 4 direction of the rotor 20 and position in the Y axis direction and angle in the 0 direction of the rotor 20 will be detectable by the displacement sensors 16, hence orientation of the rotational axis too can be sufficiently controlled by biaxial control.

[Configuration of Other Pump Applied with Rotary Drive Device]

Figure 6:
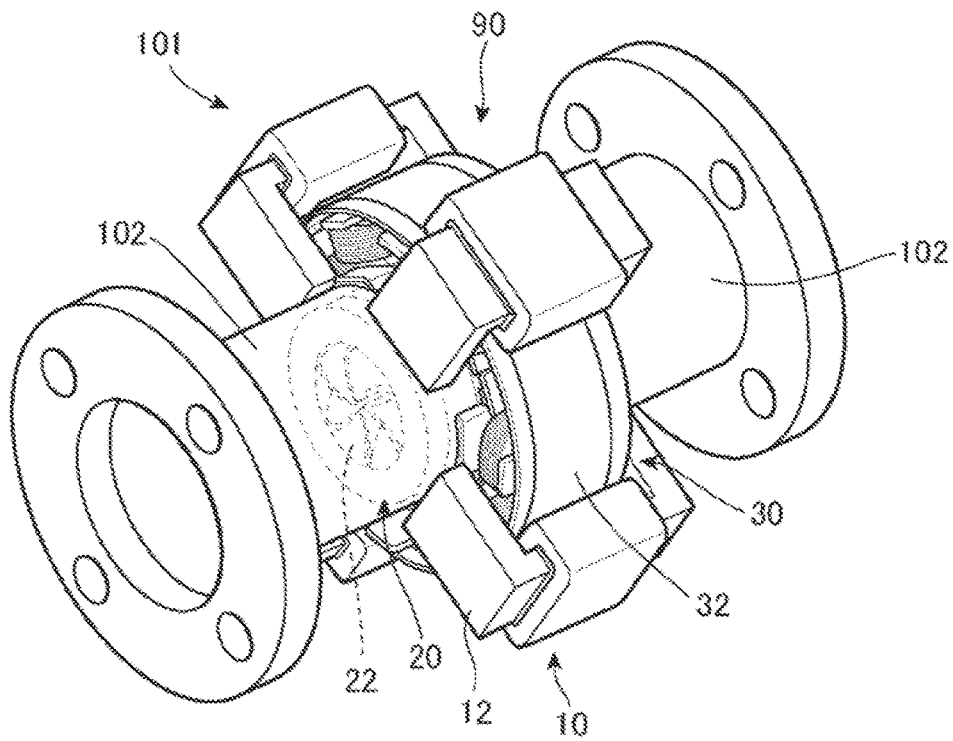

FIG. 6 is a perspective view schematically showing overall configuration of another pump 101 applied with the rotary drive device 90, with part of the overall configuration rendered see-through. As shown in FIG. 6, the pump 101 is configured so that the rotor 20 integrated with the impeller 22 of the rotary drive device 90 is inserted inside a flanged piping arrangement 102, for example, and the motor stator 32 of the drive unit 30 and bearing stator 12 of the magnetic bearing 10 are disposed on an outer peripheral side of a rotor 20 mounting place of the flanged piping arrangement 102. That is, since the rotor 20 magnetically levitates due to the magnetic bearing 10 and does not have the motor stator 32 disposed on its inner side, it can be easily disposed within the flanged piping arrangement 102. Moreover, the bearing stator 12 and motor stator 32 that support and drive the rotor 20, too, need only be mounted on an outer side of the flanged piping arrangement 102. Configuring in this way makes it possible for complicated processing of the flanged piping arrangement 102, mounting work of a pump device, and so on, to be rendered unnecessary, and for the pump 101 to be utilized as part of the piping arrangement material, for example.

Second Embodiment

[Other Configuration of Rotary Drive Device]

Figure 7:
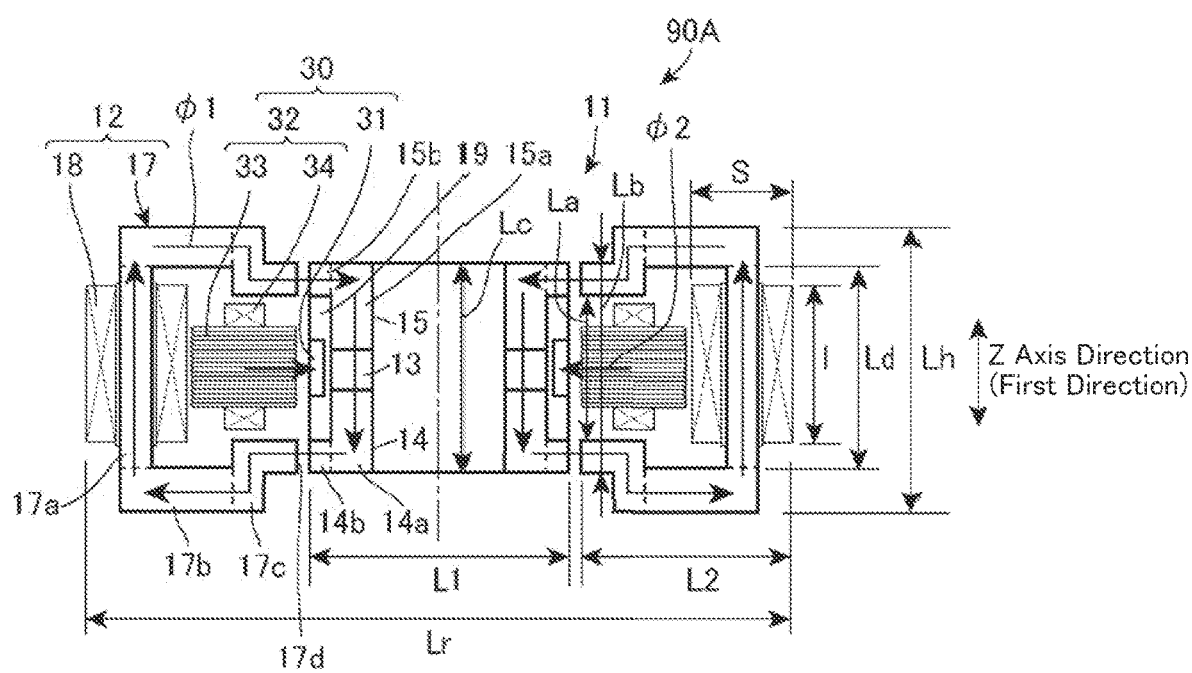
FIG. 7 is an enlarged longitudinal cross-sectional view schematically showing a rotary drive device according to a second embodiment of the present invention.
Figure 8:
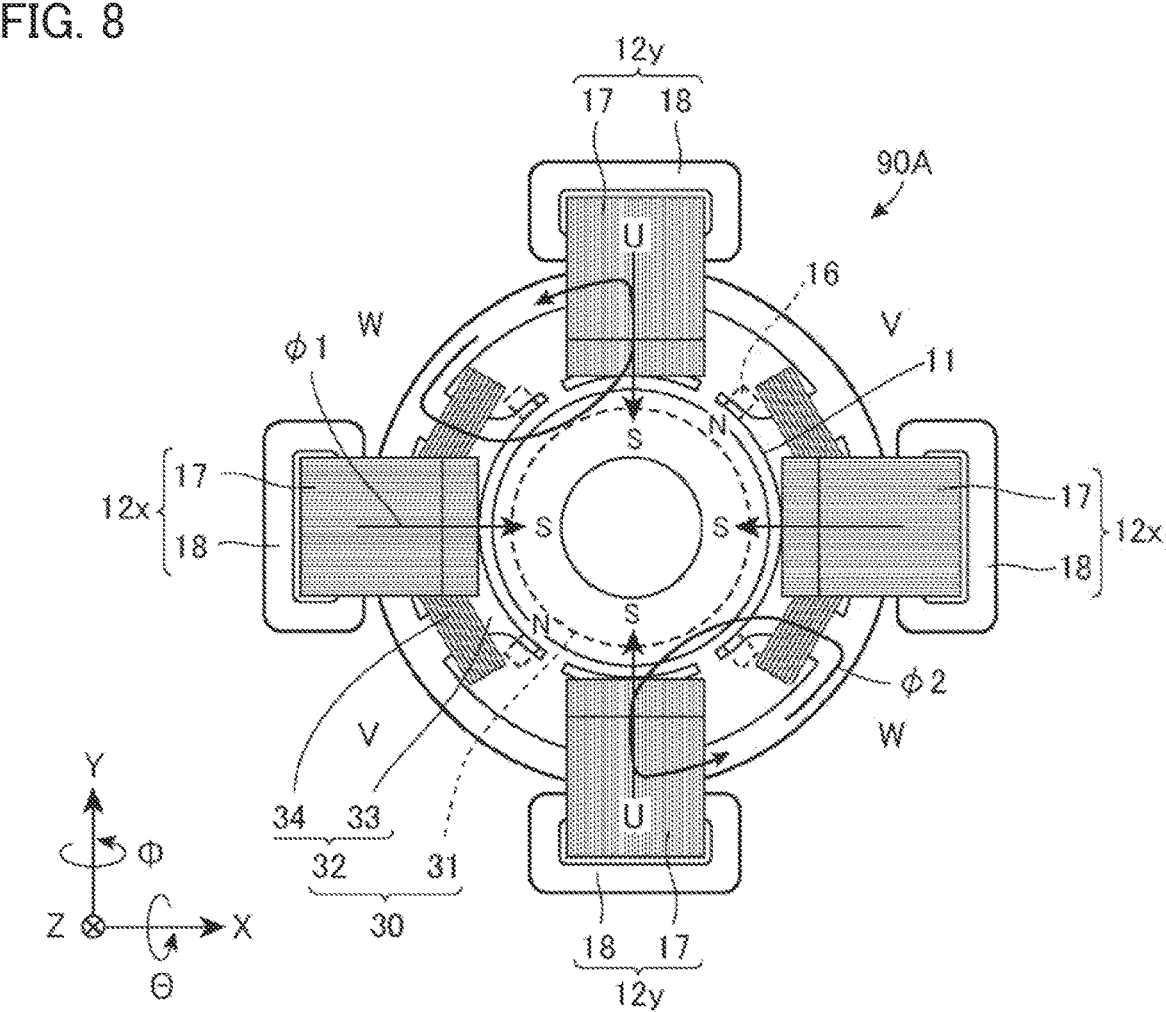
FIG. 8 is a top view schematically showing overall configuration of same rotary drive device.

FIG. 7 is an enlarged longitudinal cross-sectional view schematically showing a rotary drive device 90A according to a second embodiment; and FIG. 8 is a top view schematically showing overall configuration of the rotary drive device 90A. Note that in the description hereafter including FIGS. 7 and 8, configuring elements that are the same as in the first embodiment will be assigned with the same symbols as in the first embodiment, and duplicated explanations thereof hence omitted below.

The rotary drive device 90A of the second embodiment differs from the rotary drive device 90 of the first embodiment in, for example, having a differently shaped longitudinal cross section of the bearing stator core 17 of the bearing stator 12 of the magnetic bearing 10. That is, the bearing stator core 17 has its longitudinal cross-sectional shape formed so as to further include a pair of third portions 17c that extend in an orientation of approaching each other in the first direction (in this case, the Z axis direction) from end portions on a bearing rotor member 11 side of the pair of second portions 17b, and then extend toward the bearing rotor member 11 side, in addition to the above-mentioned first portion 17a and second portions 17b.

Figure 12:
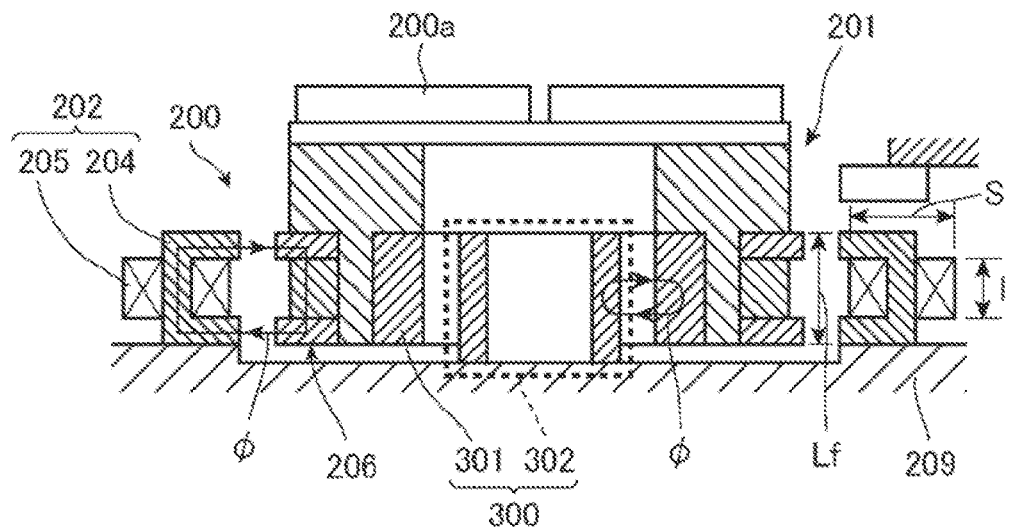
FIG. 12 is a longitudinal cross-sectional view schematically showing overall configuration of a conventional magnetic bearing and drive mechanism.

In other words, regarding its longitudinal cross-sectional shape, the bearing stator core 17 includes at its C-shaped open-end portions that originally should extend toward the bearing rotor member 11 from both ends in the Z axis direction of the first portion 17a wound around by the bearing coil 18 (refer to FIG. 12, for example) a pair of hook-shaped portions, and is shaped having its open ends brought close to each other.

When the bearing stator core 17 has such a shape, a length 1 in the Z axis direction of the bearing coil 18 can be made larger than a distance La between surfaces facing each other in the Z axis direction of the pair of third portions 17c on an open-end side of the bearing stator core 17. Moreover, width on the open-end side of the bearing stator core 17, that is, a distance Lb between surfaces on an opposite side to the surfaces facing each other in the Z axis direction of the pair of third portions 17c can be made smaller than the original length in the Z axis direction of the bearing stator core 17 (that is, the dimension in the Z axis direction of the rotary drive device 90A) Lh, and substantially equal to a length Lc in the Z axis direction of the bearing rotor member 11. Note that the motor stator 32 of the drive unit 30 is disposed from between the pair of second portions 17b to between the pair of third portions 17c of the bearing stator core 17.

Now, generally, regarding a restoring force due to a conventional magnetic bearing 200 (refer to FIG. 12), it is known that, for example, the more substantially equal to a length of a stator core 204 of a bearing stator 202 a thickness Lf in an axial direction of a bearing rotor member 206 is, and the more extremely thin this thickness Lf is, the larger this restoring force will be. On the other hand, a magnetic flux 9 is controlled by a coil 205 of the bearing stator 202, and, in order for responsiveness to be increased, it is desirable for inductance of the coil 205 to be reduced to the utmost.

This inductance of the coil 205 is proportional to cross-sectional area S of the coil 205 and inversely proportional to its coil length 1, so in order to raise responsiveness of the coil 205, the coil 205 needs to be wound on the stator core 204 in such a manner that the cross-sectional area S of the coil 205 is made small and length 1 of the coil 205 is made long.

However, if coil length 1 lengthens, then thickness Lf in the axial direction of the bearing rotor member 206 of a rotor 201 will resultantly end up increasing too, thereby resulting in the restoring force of the rotor 201 ending up lowering, and resulting in restoring torque, particularly when the rotor 201 has inclined, lowering and a dimension of the magnetic bearing 200 in the axial direction ending up increasing.

Now, as mentioned above, regarding the restoring force of position and inclination by the magnetic bearing 10 of the rotor 20, the more substantially equal to the length Lc in the Z axis direction of the bearing rotor member 11 the length Lb in the Z axis direction of the open end (the third portions 17c) of the bearing stator 12 is, and the shorter the length Lc in the Z axis direction of the bearing rotor member 11 is, the larger this restoring force will be. In this respect, the magnetic bearing 10 of the rotary drive device 90A of the second embodiment enables the length Lb in the Z axis direction of portions (the third portions 17c) facing the bearing rotor member 11 at the open end, to be made shorter compared to in the conventional C-shaped stator core 204 shown in FIG. 12.

Therefore, since the length Lc in the Z axis direction of the bearing rotor member 11 can be made shorter than in a conventional bearing rotor member while number-of-winds N of the bearing coil 18 is maintained, it is possible for a sufficient restoring force to be secured while, at the same time, downsizing in the Z axis direction of the bearing rotor member 11 is achieved. Moreover, as mentioned above, in order for responsiveness of the magnetic bearing 10 to be increased, the inductance of the bearing coil 18 must be reduced to the utmost. In this respect, the magnetic bearing 10 according to the second embodiment, due to it enabling a length Ld of the first portion 17a wound around by the bearing coil 18 of the bearing stator core 17 to be sufficiently secured, makes it possible for length 1 in the Z axis direction of the bearing coil 18 to be made long and cross-sectional area S of the bearing coil 18 to be made small, and enables inductance of the bearing coil 18 to be suppressed and responsiveness thereby improved. Note that in order to maximize attractive force of the bearing magnet 13, it is desirable for width in the Z axis direction of each third portion 17c (salient pole) of the bearing stator core 17 to be substantially equal to thickness in the Z axis direction of the yokes 14, 15.

Due to this rotary drive device 90A of the second embodiment, operational advantages similar to those of the rotary drive device 90 of the first embodiment can be displayed and the dimension in the axial direction of the bearing rotor member 11 can be made smaller. It therefore becomes possible for downsizing of the bearing/rotor unit 21, and, consequently, downsizing of the rotor 20 to be promoted, and for further downsizing overall to be achieved.

Third Embodiment

[Other Configuration of Rotary Drive Device]

Figure 9:
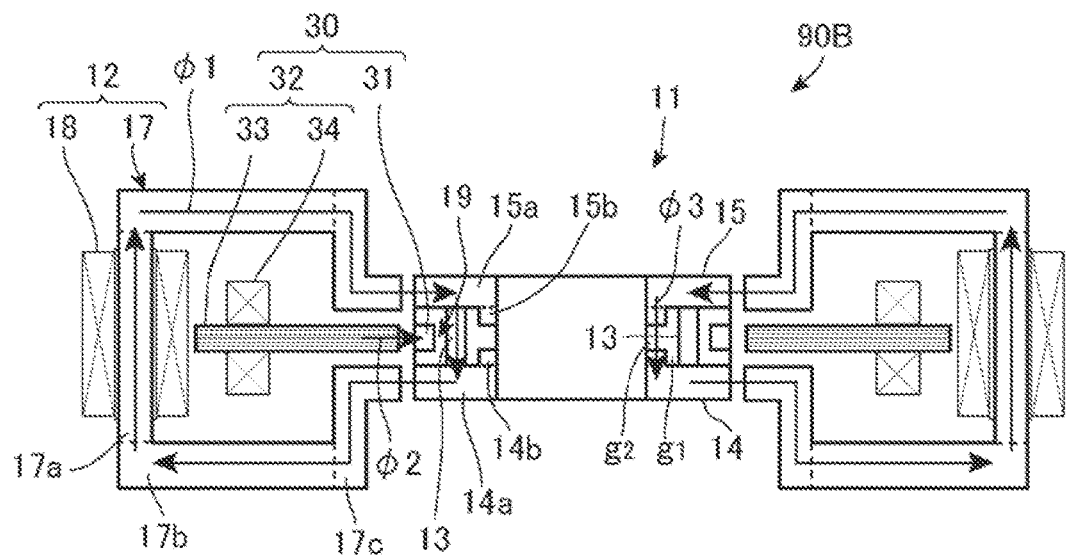
FIG. 9 is an enlarged longitudinal cross-sectional view schematically showing a rotary drive device according to a third embodiment of the present invention.

FIG. 9 is an enlarged longitudinal cross-sectional view schematically showing a rotary drive device 90B according to a third embodiment.

In the rotary drive device 90B of the third embodiment, as shown in FIG. 9, configuration of the bearing rotor member 11, and shape and disposed state in the space inside the bearing stator core 17, of the motor stator 32 in the magnetic bearing 10, differ from in the rotary drive device 90A of the second embodiment.

That is, the bearing rotor member 11 is similar in that, for example, it includes: the circular ring-shaped bearing magnet 13; and the pair of circular ring-shaped yokes 14, 15 concentric with this bearing magnet 13 and disposed so as to sandwich the bearing magnet 13 from both sides in the axial direction, but differs regarding details thereof. In the third embodiment, the pair of yokes 14, 15 have their longitudinal cross-sectional shape configured in substantially a U shape that has its open end on the bearing stator 12 side and has been severed at its midpoint in the Z axis direction, for example.

Specifically, the longitudinal cross-sectional shape of the pair of yokes 14, 15 includes: the pair of fourth portions 14a, 15a that cover both end surfaces in the first direction (here, the Z axis direction) of the bearing magnet 13, and while doing so, extend along a second direction orthogonal to the Z axis direction (here, the radial direction (the X axis direction)); and the pair of fifth portions 14b, 15b that extend in an orientation of approaching each other in the Z axis direction from end portions on an opposite side to the bearing stator 12 of these pair of fourth portions 14a, 15a. Inner peripheral portions of the fourth portions 14a, 15a project further to the inside and outside than an inner peripheral portion and outer peripheral portion of the bearing magnet 13.

Between surfaces facing each other in the first direction more to the bearing stator 12 side than the bearing magnet 13 of the fourth portions 14a, 15a, there is disposed confined to the dimension (diameter) L1 of the bearing rotor member 11 the motor magnet 31 supported in such a manner as to be contactless with the yokes 14, 15 and the bearing magnet 13, and between the fifth portions 14b, 15b and the bearing magnet 13, there is formed a first gap g1. Moreover, between facing tip portions of these pair of fifth portions 14b, 15b, there is provided a second gap g2.

When the bearing rotor member 11 has such a shape, the two magnetic poles of the bearing magnet 13 can be prevented from coming too close to the fifth portions 14b, 15b by the first gap g1, so the bias magnetic flux φ1 due to the bearing magnet 13 can be stably supplied to the bearing stator 12. Moreover, since a magnetic circuit due to the fifth portions 14b, 15b whose magnetic resistance is small is formed in parallel with the bearing magnet 13 whose magnetic resistance is large, it becomes possible for a control magnetic flux φ3 generated by the bearing coil 18 to pass through the bearing rotor member 11 with extremely low loss. However, if the second gap g2 is not present, then the two magnetic poles of the bearing magnet 13 will end up short-circuiting via the fifth portions 14b, 15b, so it is desirable for width of the second gap g2 to be appropriately set considering a balance between stable supply to the bearing stator 12 side of the bias magnetic flux φ1 and magnetic resistance of the magnetic circuit passed through by the control magnetic flux φ3.

On the other hand, in the present embodiment, unlike in the structure shown in FIG. 7, the motor coil 34 configuring the motor stator 32 is not located between the third portions 17c of the bearing stator core 17, but confined to a position between the second portions 17b of the bearing stator core 17. Moreover, between the third portions 17c of the bearing stator core 17, there is located solely a tip portion extending toward the rotor 20 of the motor stator core 33. That is, the motor stator 32, by having its motor stator core 33 and motor coil 34 housed between the pair of second portions 17b of the bearing stator core 17, and having an extended portion of its motor stator core 33 disposed between the pair of third portions 17c of the bearing stator core 17, on an inner side in the radial direction of the bearing coil 18 in the bearing stator 12, is disposed so as to be confined to within the dimension L2 in the radial direction of the bearing stator 12.

Due to this rotary drive device 90B of the third embodiment, operational advantages similar to those of the rotary drive device 90A of the second embodiment can be displayed and it is possible for the dimension in the axial direction of the bearing rotor member 11 to be made even smaller, so it becomes possible for downsizing of the bearing/rotor unit 21 and rotor 20 to be promoted, and for downsizing overall to be thereby further achieved.

Fourth Embodiment

Figure 10:
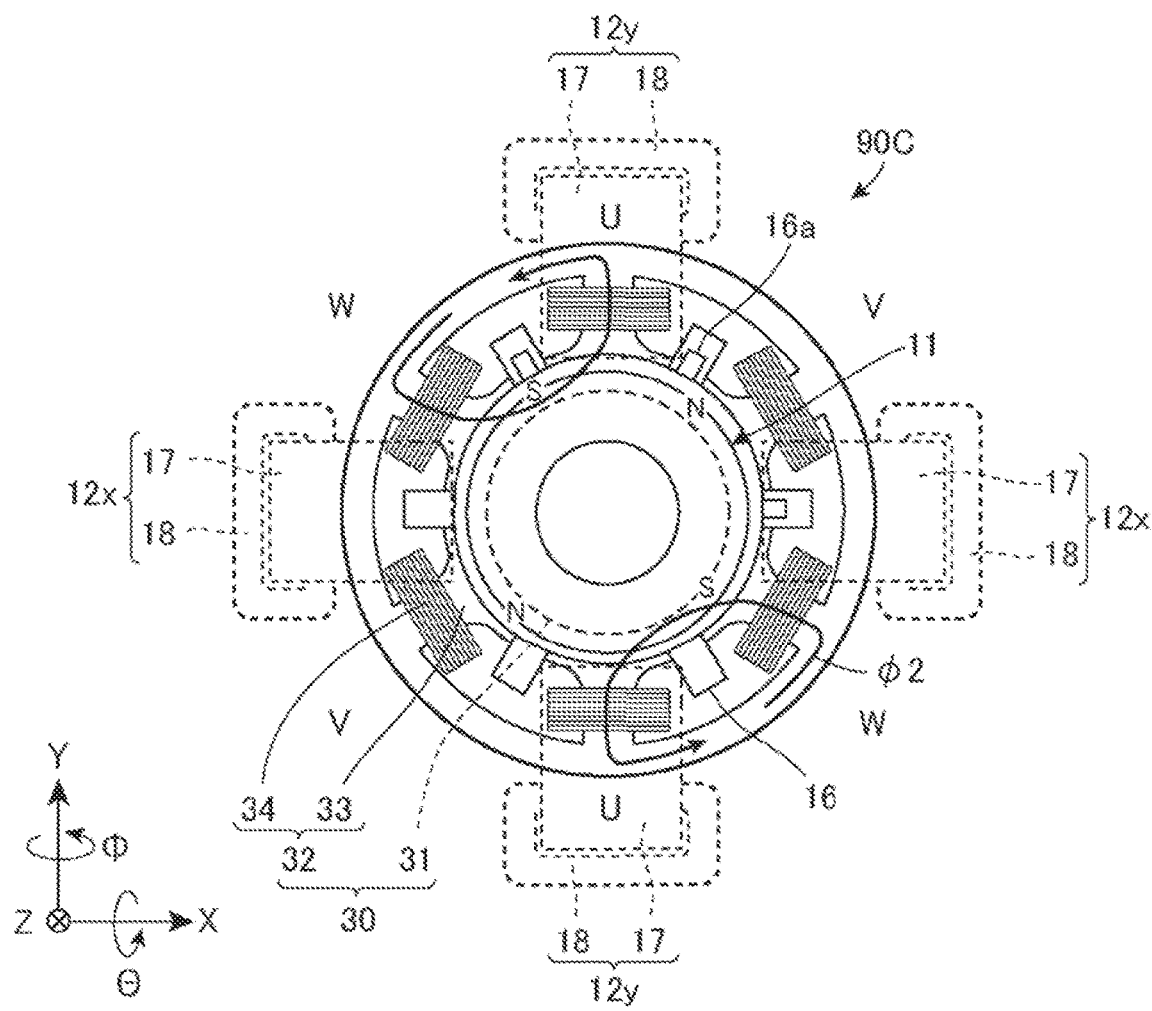
FIG. 10 is a top view schematically showing a drive unit of a rotary drive device according to a fourth embodiment of the present invention.

FIG. 10 is a top view schematically showing the drive unit 30 of a rotary drive device 90C according to a fourth embodiment.

In this embodiment, six of the displacement sensors 16, each consisting of an eddy current sensor, or the like, are provided at angles of 60° between six slots adjacent in a peripheral direction of the motor stator 32, as the displacement sensors 16. The Hall ICs 16a are disposed in vicinities of some of the displacement sensors 16.

When the displacement sensors 16 are disposed in this way, each of the slots of the motor stator 32 and the displacement sensors 16 do not positionally interfere with each other, so the displacement sensors 16 can be disposed in a center portion in the Z axis direction of the bearing rotor member 11. As a result, positional shift in the radial direction and tilting of the rotor 20 can be detected at an appropriate position.

Fifth Embodiment

Figure 11A:
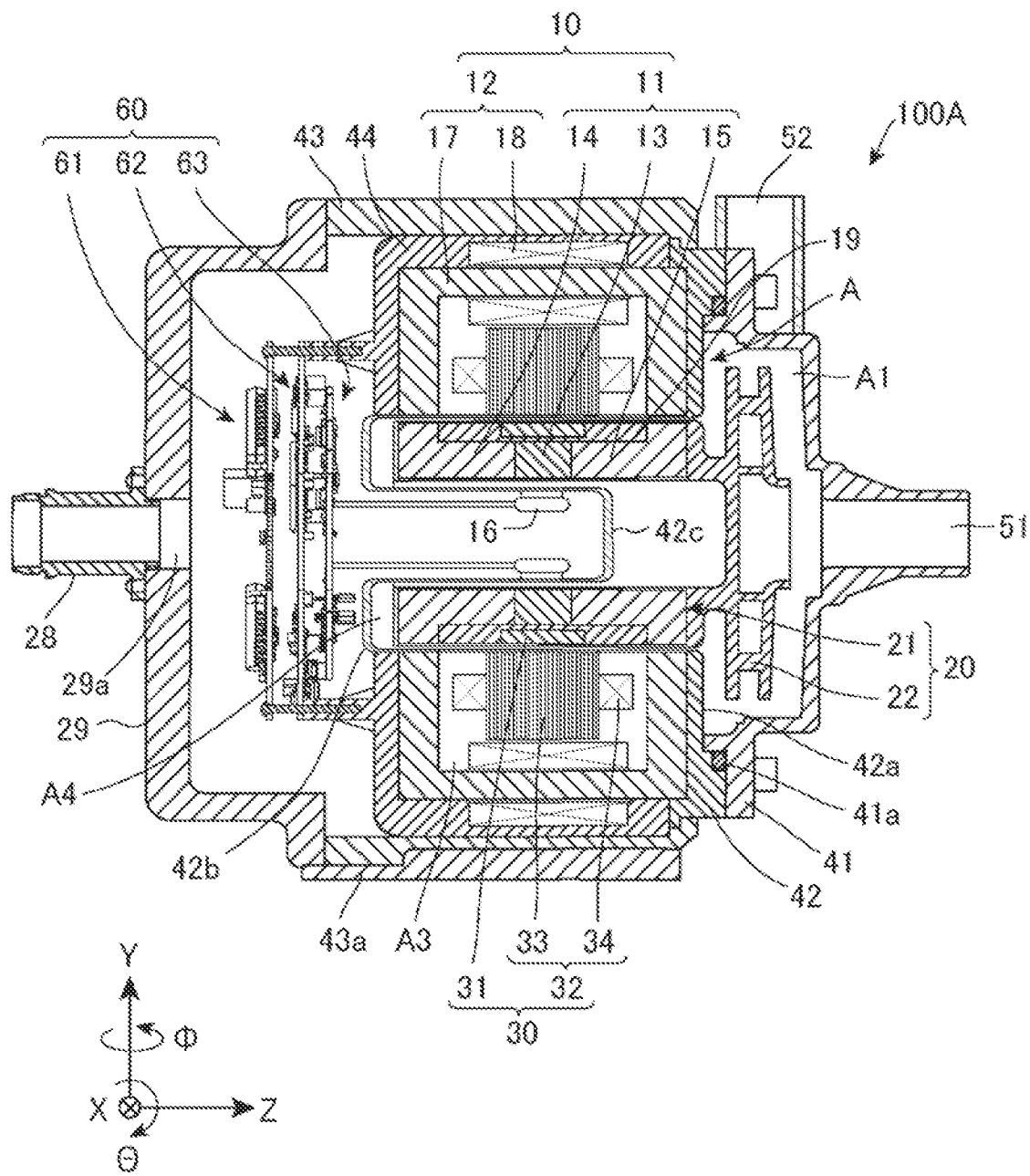
FIG. 11A is a longitudinal cross-sectional view schematically showing overall configuration of a pump applied with a rotary drive device according to a fifth embodiment of the present invention.
Figure 11B:
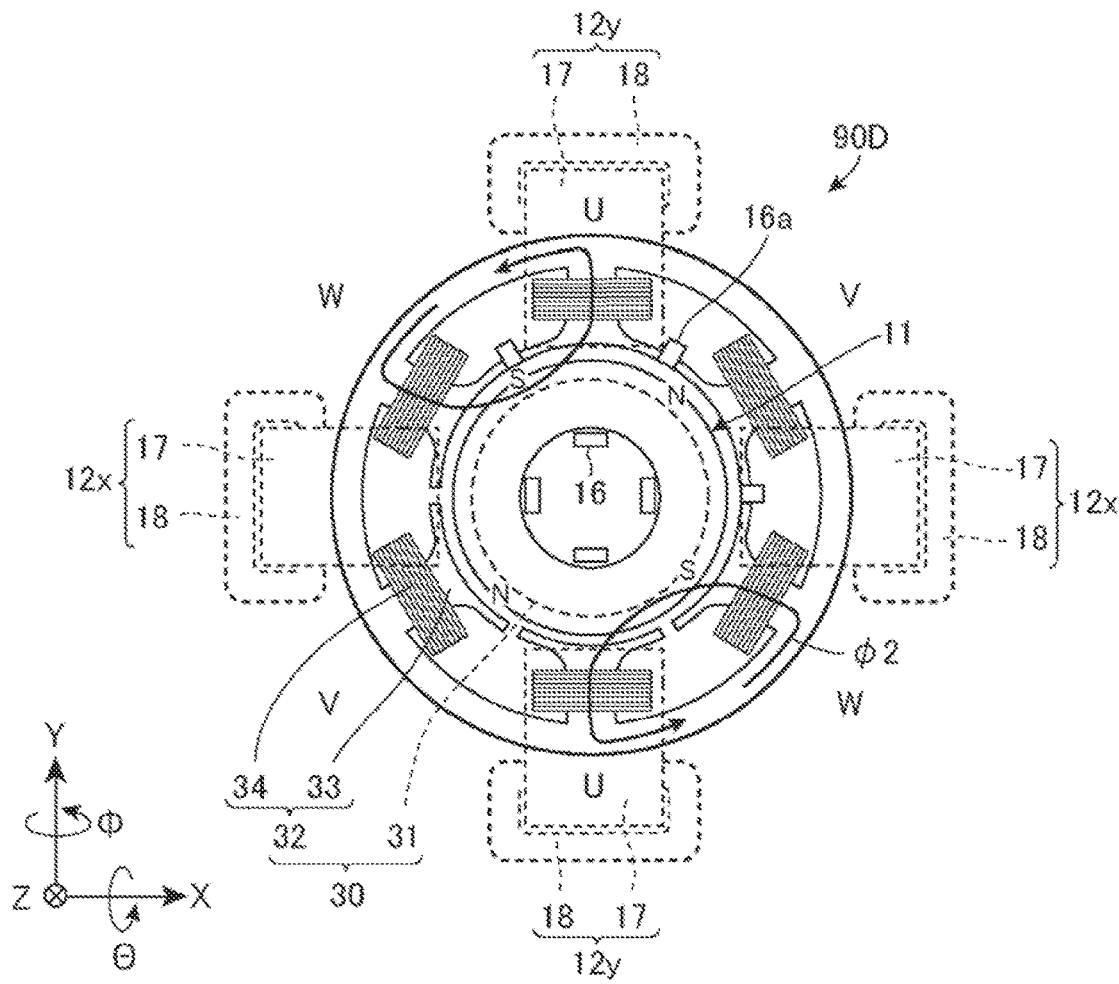
FIG. 11B is a top view schematically showing a drive unit of same rotary drive device.

FIG. 11A is a longitudinal cross-sectional view schematically showing overall configuration of a pump 100A applied with a rotary drive device 90D according to a fifth embodiment; and FIG. 11B is a top view schematically showing the drive unit 30 of the rotary drive device 90D.

In this embodiment, four of the displacement sensors 16 are disposed at angles of 90° in a peripheral direction on an inner peripheral side of the bearing rotor member 11. That is, the cylindrical projection 42b extending to a rear side of the rear casing 42 includes in its center portion a forwardly-extending cylindrical projection 42c, and the bearing rotor member 11 is disposed within an annular space A4 formed by the cylindrical projection 42b and the cylindrical projection 42c. Moreover, the four displacement sensors 16 are disposed on an inner side of the cylindrical projection 42c. In this case, places where the displacement sensors 16 are disposed will never be limited by the motor stator 32, so the displacement sensors 16 can be easily disposed in the center portion in the Z axis direction of the bearing rotor member 11.

The present embodiment too, similarly to the fourth embodiment, enables the displacement sensors 16 to be disposed in the center portion in the Z axis direction of the bearing rotor member 11, and thus enables positional shift in the radial direction and tilting of the rotor 20 to be detected at an appropriate position.

While certain embodiments have been described, these embodiments have been presented by way of example only, and are not intended to limit the scope of the inventions. Indeed, the novel methods and systems described herein may be embodied in a variety of other forms: furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

DESCRIPTION OF REFERENCE NUMERALS 10 magnetic bearing
11 bearing rotor member
12 bearing stator
13 bearing magnet
14, 15 yoke
16 displacement sensor
17 bearing stator core
17a first portion
17b second portion
17c third portion
18 bearing coil
20 rotor
30 drive unit
31 motor magnet
32 motor stator
33 motor stator core
34 motor coil
90 rotary drive device
100 pump

The invention claimed is:

1. A rotary drive device comprising:
a rotor;
a magnetic bearing that supports the rotor in a contactless manner by a magnetic force; and
a drive unit that rotationally drives the rotor,
the magnetic bearing comprising:
a bearing stator disposed on an outer peripheral side of the rotor to support the rotor in a contactless manner by a magnetic force; and
a ring-shaped bearing rotor member provided in the rotor, the bearing rotor member consisting of a magnetic material and forming a magnetic circuit along with the bearing stator,
the drive unit including:
a drive stator disposed on an outer peripheral side of the rotor to apply a rotational driving force to the rotor; and
a ring-shaped drive rotor member disposed on an outer peripheral side of the bearing rotor member of the rotor to receive a rotational driving force from the drive stator,
the bearing stator including:
a plurality of bearing stator cores disposed on an outer peripheral side of the bearing rotor member, the bearing stator cores consisting of a magnetic material and forming a magnetic circuit along with the bearing rotor member; and
a bearing coil wound around the bearing stator core, the bearing stator core including:
a first portion extending in a first direction orthogonal to a direction facing the bearing rotor member; and
a pair of second portions extending to a bearing rotor member side from both end portions in the first direction of the first portion,
the bearing coil being wound around the first portion of the bearing stator core, and
the drive stator being formed so as to pass through a position between an outer peripheral surface of the rotor and the first portion of the bearing stator core and between the pair of second portions of the bearing stator core in the first direction.

2. The rotary drive device according to claim 1, wherein the bearing stator core is formed so as to further include a pair of third portions that extend in an orientation of approaching each other in the first direction from the end portions on the bearing rotor member side of the pair of second portions, and then extend toward the bearing rotor member side.

3. The rotary drive device according to claim 1, wherein the bearing rotor member includes:
a circular ring-shaped bearing magnet; and
a pair of circular ring-shaped yokes disposed so as to sandwich the bearing magnet in the first direction,
the pair of yokes include:
a pair of fourth portions covering both end surfaces in the first direction of the bearing magnet and extending in the first direction; and
a pair of fifth portions extending to a bearing stator side from end portions on an opposite side to the bearing magnet of the pair of fourth portions, and
between facing surfaces in the first direction of the pair of fifth portions, there is disposed a spacer consisting of a non-magnetic body, that supports the drive rotor member in such a manner that the drive rotor member will be contactless with the pair of yokes and the bearing magnet.

4. The rotary drive device according to claim 1, wherein the bearing rotor member includes:
a circular ring-shaped bearing magnet; and
a pair of circular ring-shaped yokes disposed so as to sandwich the bearing magnet in the first direction,
the pair of yokes include:
a pair of fourth portions covering both end surfaces in the first direction of the bearing magnet and extending in a direction facing the bearing stator; and
a pair of fifth portions extending in an orientation of approaching each other in the first direction from end portions on an opposite side to the bearing stator of the pair of fourth portions,
between facing surfaces in the first direction further to a bearing stator side than the bearing magnet of the pair of fourth portions, there is disposed a spacer consisting of a non-magnetic body, that supports the drive rotor member in such a manner that the drive rotor member will be contactless with the pair of yokes and the bearing magnet,
between the fifth portions and the bearing magnet, there is formed a first gap, and
between each of tip portions facing each other of the pair of fifth portions, there is provided a second gap.

5. The rotary drive device according to claim 1, wherein a plurality of the bearing stators are disposed along a peripheral direction of the bearing rotor member on an outer side in a radial direction of the bearing rotor member, and the bearing stators each face the bearing rotor member in a radial direction.

6. The rotary drive device according to claim 1, wherein the drive stator includes: a circular ring-shaped drive stator core that faces the drive rotor member from an outer side in a radial direction, the drive stator core consisting of a magnetic material and having a plurality of magnetic poles that lie along a peripheral direction of the drive rotor member; and a drive coil wound around a slot of the drive stator core.

7. A pump comprising:
a rotor;
a magnetic bearing that supports the rotor in a contactless manner by a magnetic force;
a drive unit that rotationally drives the rotor; and
a pump mechanism that includes an impeller which is fitted to the rotor,
the magnetic bearing comprising:
a bearing stator disposed on an outer peripheral side of the rotor to support the rotor in a contactless manner by a magnetic force; and
a ring-shaped bearing rotor member provided in the rotor, the bearing rotor member consisting of a magnetic material and forming a magnetic circuit along with the bearing stator,
the drive unit including:
a drive stator disposed on an outer peripheral side of the rotor to apply a rotational driving force to the rotor; and
a ring-shaped drive rotor member disposed on an outer peripheral side of the bearing rotor member of the rotor to receive a rotational driving force from the drive stator,
the bearing stator including:
a plurality of bearing stator cores disposed on an outer peripheral side of the bearing rotor member, the bearing stator cores consisting of a magnetic material and forming a magnetic circuit along with the bearing rotor member; and
a bearing coil wound around the bearing stator core, the bearing stator core including:
a first portion extending in a first direction orthogonal to a direction facing the bearing rotor member; and
a pair of second portions extending to a bearing rotor member side from both end portions in the first direction of the first portion,
the bearing coil being wound around the first portion of the bearing stator core, and
the drive stator being formed so as to pass through a position between an outer peripheral surface of the rotor and the first portion of the bearing stator core and between the pair of second portions of the bearing stator core in the first direction.

8. The pump according to claim 7, wherein the bearing stator core is formed so as to further include a pair of third portions that extend in an orientation of approaching each other in the first direction from the end portions on the bearing rotor member side of the pair of second portions, and then extend toward the bearing rotor member side.

9. The pump according to claim 7, wherein the bearing rotor member includes:
a circular ring-shaped bearing magnet; and
a pair of circular ring-shaped yokes disposed so as to sandwich the bearing magnet in the first direction, the pair of yokes include:
a pair of fourth portions covering both end surfaces in the first direction of the bearing magnet and extending in the first direction; and
a pair of fifth portions extending to a bearing stator side from end portions on an opposite side to the bearing magnet of the pair of fourth portions, and
between facing surfaces in the first direction of the pair of fifth portions, there is disposed a spacer consisting of a non-magnetic body, that supports the drive rotor member in such a manner that the drive rotor member will be contactless with the pair of yokes and the bearing magnet.

10. The pump according to claim 7, wherein
the bearing rotor member includes:
a circular ring-shaped bearing magnet; and
a pair of circular ring-shaped yokes disposed so as to sandwich the bearing magnet in the first direction,
the pair of yokes include:
a pair of fourth portions covering both end surfaces in the first direction of the bearing magnet and extending in a direction facing the bearing stator; and
a pair of fifth portions extending in an orientation of approaching each other in the first direction from end portions on an opposite side to the bearing stator of the pair of fourth portions,
between facing surfaces in the first direction further to a bearing stator side than the bearing magnet of the pair of fourth portions, there is disposed a spacer consisting of a non-magnetic body, that supports the drive rotor member in such a manner that the drive rotor member will be contactless with the pair of yokes and the bearing magnet,
between the fifth portions and the bearing magnet, there is formed a first gap, and
between each of tip portions facing each other of the pair of fifth portions, there is provided a second gap.

11. The pump according to claim 7, wherein
a plurality of the bearing stators are disposed along a peripheral direction of the bearing rotor member on an outer side in a radial direction of the bearing rotor member, and the bearing stators each face the bearing rotor member in a radial direction.

12. The pump according to claim 7, wherein
the drive stator includes: a circular ring-shaped drive stator core that faces the drive rotor member from an outer side in a radial direction, the drive stator core consisting of a magnetic material and having a plurality of magnetic poles that lie along a peripheral direction of the drive rotor member; and a drive coil wound around a slot of the drive stator core.

* * * * *